March 15, 1955  F. A. WERSTEIN  2,704,360
SELF-CANCELLING TURN SIGNAL INDICATOR
Filed Nov. 20, 1951  3 Sheets-Sheet 1
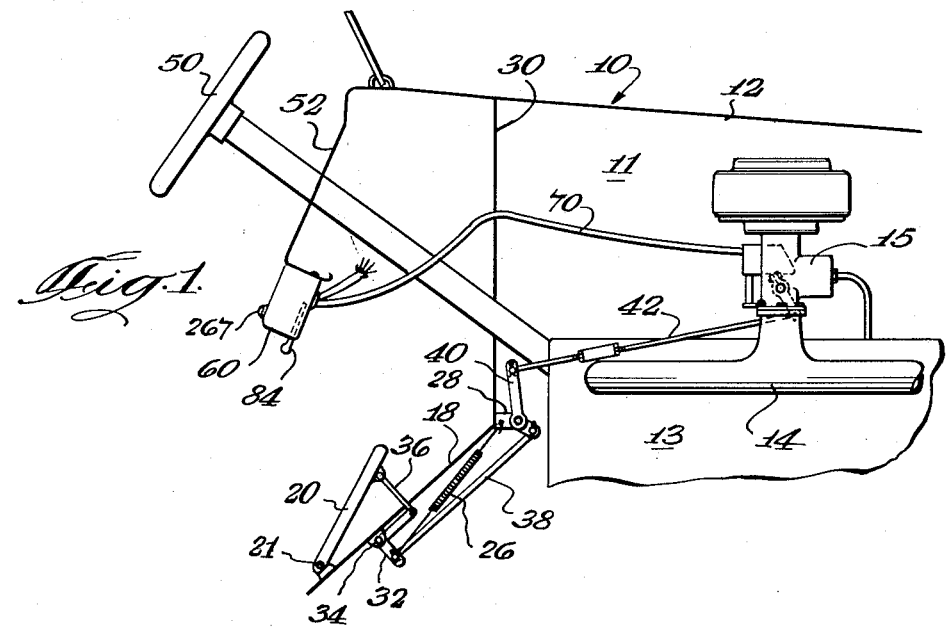
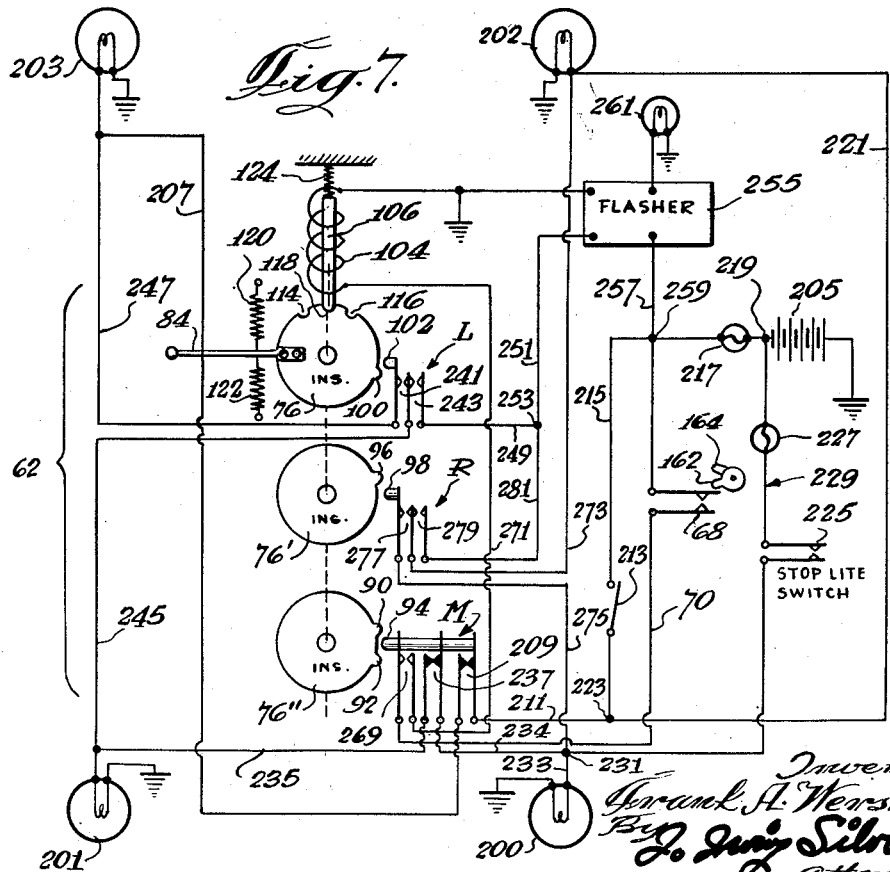

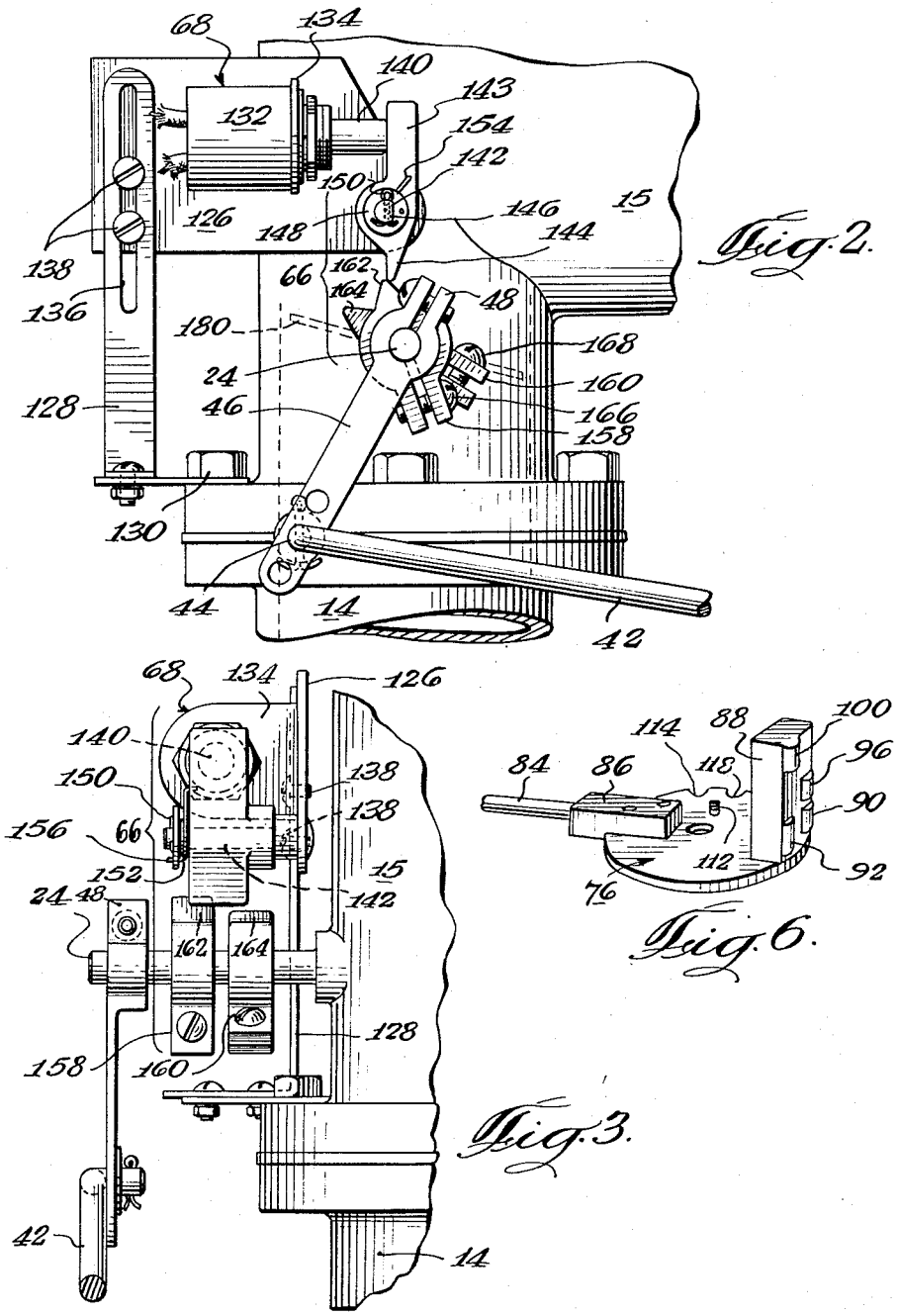

March 15, 1955   F. A. WERSTEIN   2,704,360
SELF-CANCELLING TURN SIGNAL INDICATOR
Filed Nov. 20, 1951                                          3 Sheets-Sheet 3
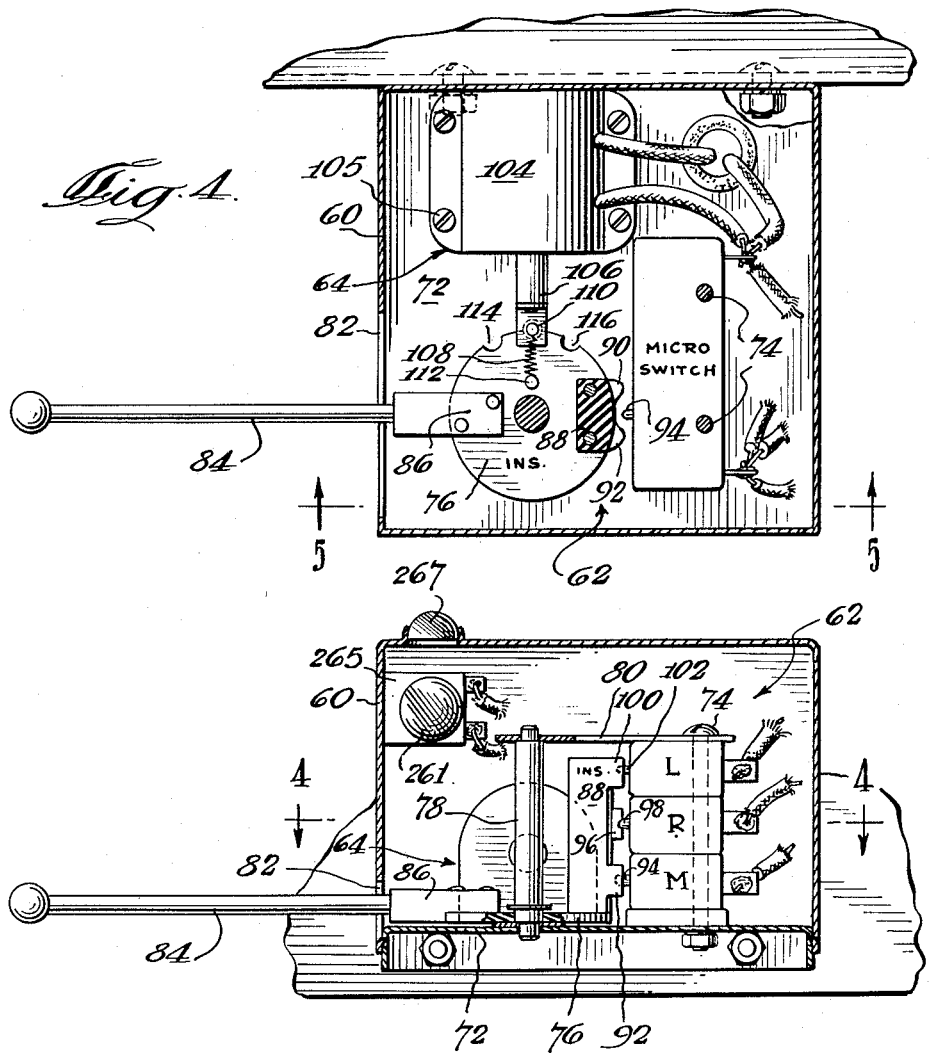

United States Patent Office 2,704,360
Patented Mar. 15, 1955

2,704,360

SELF-CANCELLING TURN SIGNAL INDICATOR

Frank A. Werstein, Long Beach, Ind.

Application November 20, 1951, Serial No. 257,279

5 Claims. (Cl. 340—56)

This invention relates to turn signal indicators and more particularly is concerned with a turn signal indicator which is self-cancelling.

The device, subject matter of this invention, is intended for use as an adjunct or accessory for an automobile to enable the driver electrically to signal his intention to turn said automobile right or left. Such signalling devices are well-known in the art and have been constructed in many different ways.

Prior devices have utilized the driver's restoration of the steering gear to actuate some manner of return means, so that after a turn has been made the latch or detent or ratchet, as the case may be, is released by a suitable projection or other device carried by the steering wheel or column, but only after the same has been rotated in one direction a certain number of degrees. All of such mechanical devices, as well as some electrical devices operating from the steering gear, require that the initial turning of the wheel carry the vehicle into a turn which is a substantial portion of 90°. Under such conditions, a small turn signalled by the driver will not result in sufficient movement of the steering gear to carry the cancelling means far enough so that same will operate when the vehicle is pointed forward.

One of the principal objects of the invention is to alleviate the disadvantage above set forth and to provide a construction in which the signals indicated may be cancelled regardless of the degree of turning of the vehicle, and more generally, the object is to provide a self-cancelling turn signal indicator which operates independently of the steering gear of the vehicle.

In connection with the immediate object set forth above, the modern vehicle steering gear is structurally complicated by the presence of electrical and mechanical speed changing mechanisms and electrical connections for the audible signalling device associated with the steering column and wheel. It is therefore another object of the invention to provide a construction comprising a self-cancelling turn signal indicator which is completely disassociated from the steering mechanism such that it can be mounted on the dashboard, or at any other convenient location, for ready use by the driver.

Still a further object of the invention is to provide a self-cancelling turn signal indicator which is adapted manually to be actuated by the vehicle operator to signal a turn and which is then returned to neutral after the turn has been made by the operator's act of depressing the accelerator.

Another object of the invention is to provide a device of the character described in which the connection between the switching mechanism and the accelerator linkage is electrical and can be set to operate at one or more given speeds of the vehicle corresponding to a given position or positions of the accelerator linkage.

Prior structures being mechanical would operate to move the signal switch to neutral position whether the vehicle was being accelerated or decelerated, thereby limiting the maneuverability of the vehicle while the signal was operating. The invention has as another object the provision of a device which will act to cancel signals, not only at a number of different speeds, but also to cancel such signals only while the vehicle is being accelerated.

Still further objects of the invention reside in the provision of a novel and improved construction which will be compact and simple to install; which will be economical and suitable for connection to operate in circuit with the stop lights of the automobile; which will include novel detent means for retaining the switching mechanism in different positions to which same is moved; and which will include switch means associated with the accelerator linkage at the carburetor where same is easily adjusted to operate at desired settings of fuel consumption.

Other objects and advantages will appear as the description of the invention proceeds in connection with which there have been shown and illustrated a preferred embodiment in all of its details in order to enable a better understanding of the invention and the manner in which to construct and use the same.

Fig. 1 is a somewhat diagrammatic elevational view of a portion of an automobile or the like showing the manner in which the various components of the invention are associated therewith.

Fig. 2 is a side elevational view of the cancelling switch and the mechanism for actuating the same, showing the manner in which same is installed adjacent the carburetor of the vehicle.

Fig. 3 is a front elevational view of the same.

Fig. 4 is a sectional view taken through the signalling switch mechanism and associated structure along the line 4—4 of Fig. 5 and in the indicated direction.

Fig. 5 is a sectional view through the same but along the line 5—5 of Fig. 4 and in the indicated direction.

Fig. 6 is a perspective view of one part of the mechanism illustrated in Figs. 4 and 5.

Fig. 7 is a schematic electrical diagram, showing the circuit of a practical working installation of the invention associated with a modern automobile.

Generally, the invention comprises a turn signal switching mechanism with a manually actuable pivoted lever or the like to enable the driver to move the lever to one of two positions. In neutral position, the pivoted lever may engage certain circuit setting switches or may be arranged so that no electrical circuits are energized. In one position, the lever may cause electrical circuits to indicate that a right turn is to be made, and in another position the lever may cause electrical circuits to indicate that a left turn is to be made. The turn signal switching mechanism includes a detent biased to hold the lever in any position to which it is moved, and the lever is biased to return to its neutral position unless prevented from doing so by the detent. The accelerator linkage has associated therewith, preferably adjacent the carburetor, a cancelling mechanism which includes a cancelling switch, actuating means, and an electrical connection between the cancelling switch and the detent. The detent is capable of being moved by means of electromagnetic attraction to release the lever, and when the actuating means closes the cancelling switch, a suitable electromagnet accomplishes such movement.

The cancelling mechanism is adjustable to operate at any one of a number of different settings of the carburetor corresponding generally to different speeds of the vehicle, and is preferably uni-directional in such operability so that upon deceleration, the cancelling switch will not be closed.

Referring now to the drawings, the reference character 10 designates generally an automobile or other vehicle having the invention associated therewith. There are shown in Fig. 1 a vehicle having an engine compartment 11 beneath the bonnet 12 housing an engine 13 having an inlet fuel manifold 14 fed by a carburetor 15. The exact construction of all of these parts is not material to the invention. It is only required that there be an engine, having some manner of fuel feed operable by the driver of the vehicle. Thus, the speed of the vehicle 10 is generally dependent upon the amount of fuel permitted to enter the manifold 14. There is illustrated a floor board 18 on the interior of the vehicle as a part of the compartment thereof. A treadle 20 is pivotally mounted at 21 to the floor board 18, said treadle comprising the accelerator or throttle control. Any suitable linkage transfers the movement of the treadle 20 to the carburetor control shaft 24, said shaft being connected with a suitable valve of the carburetor in accordance with well known constructional practice.

The treadle 20 is biased upward to its zero speed position by a coil spring 26 connected between the bracket 28 secured to the firewall 30, there being a crank arm 32 pivoted to the floor board at 34 and having one arm linked to the treadle 20 as at 36 through a suitable opening in the floor board, and the other arm linked by a rod 38 to the crank arm 40. Crank arm 40 is mounted on the bracket 28 and has the end opposite that connected with rod 38 connected to a push rod 42. In depressing the treadle, this push rod 42 moves to the right as viewed in Fig. 1. A better understanding is obtained by examining Fig. 2 which is a view from the side opposite that shown in Fig. 1. In this view, depressing the treadle 20 moves the pushrod 42 to the left. The end of the rod 42 is pivotally secured at 44 to the rocker arm 46 which is clamped to the shaft 24 by any suitable means such as the split clamp 48.

Returning once more to Fig. 1, the additional elements of interest are the steering wheel 50 with its shaft extending through the dash 52 and connecting with any of the well-known steering mechanisms.

As thus far described, the vehicle 10 is conventional in every respect, the same per se does not comprise the invention, nor is the form thereof important to the operation of the invention. There follows the specific additions to the vehicle which comprise the invention.

The turn signal indicator comprises generally three parts or general sections, the signalling switch mechanism and circuits, the cancelling switch and its mechanism, and the detent device operating in conjunction with the cancelling switch. The division of the invention into parts or sections is more or less arbitrary since each designated part may include more or less actual structural elements than assigned, and there may be a convenient division into more or less parts. The division used herein is only to enable the explanation more readily to be followed and understood.

As will be noted in Fig. 1, there is a housing 60 which is secured to the bottom of the dash 52, but which by reason of the novel manner in which the device operates can be secured at any convenient position. The housing 60 contains the signalling switch mechanism which shall be designated generally 62, and the detent device which shall be designated generally 64. The only other part of the device is the cancelling switch and mechanism which is secured to the carburetor as will be described. This part may be said to comprise two parts, namely the switch actuating means designated generally 66 and the cancelling switch which is designated generally 68. The only connection between the housing 60 and the switch 68 is achieved by a suitable electrical cable 70, the remainder of the electrical circuit for operating the device being independent of the said switch 68.

Without entering upon a detailed discussion of the actual circuit which is described hereinafter in connection with Fig. 7, let us presume that there is a right turn indicating circuit, and a left turn indicating circuit, and that the primary concern is manually to operate the signalling switch mechanism selectively to energize these circuits. Obviously the purpose of energizing the circuits is to give warning to other vehicles that a right or left turn is contemplated, and this is done by having visible signal lights which become illuminated when the respective circuit is energized.

The housing 60 has a bank of switches which are designated M, R, and L for "master," and "left" and "right."

When the switches L or R are energized, the respective signalling is accomplished, and the master switch M is intended to be energized regardless of which of the signalling circuits is in operation. When none of the switches is energized, no signalling is accomplished.

The housing 60 has a base 72 upon which the bank of switches is mounted as shown in Figs. 4 and 5 by suitable bolts 74. A disc 76 is pivotally mounted at the bottom end of a shaft 78 braced at its upper end by the arm 80 which is secured by one of the bolts 74. The disc 76 is actually a pivotal lever by means of which the switches L, R and M are actuated. The side wall of the housing 60 has a slot 82 through which the lever arm 84 extends. This is the manual arm by means of which the driver can pivot the lever 76 to actuate any desired switch, and it is secured to the disc at 86.

The pivotal lever or disc 76 has a vertical block 88 attached thereto and extending upwardly therefrom.

Said block has a plurality of switch button engaging projections thereon. Since the bottom switch M is the master switch, there are provided two projections 90 and 92 either of which may engage the switch button 94. The next higher switch R operates the right hand signalling circuit and hence the block 88 has a right hand projection 96 for engaging the switch button 98 when the lever 76 has been moved to the right. The top switch L energizes the left hand circuit and hence the block 88 has a left hand projection 100 for engaging the switch button 102 to close the switch L.

Referring now to Fig. 4, the detent device comprises solenoid 104 mounted on the base 72 by screws 105 and having a slidable core 106 therein. When the solenoid 104 is not energized, the core 106 is pulled downward as viewed in Fig. 4 by reason of a coil spring 108 which extends between a vertical cam or pin 110 and a pin 112 carried by the disc 76. The spring tends to pull the pin 110 into one of the circumferential detent recesses 114, 116, or 118. When the pin 110 is in recess 118, the switch mechanism 62 is in neutral position, and the spring 108 is aligned with the axis of the shaft 78, but when through movement of the arm 84 the lever 76 is pivoted right or left and the pin 110 is engaged in one or the other of the recesses 114 or 116, the pin 112 has been rotated slightly and a moment is created which tends to restore the lever 76 to neutral position.

In view of the above, when the solenoid 104 is energized the core 106 is retracted and the pin 110 lifted out of either the recess 114 or 116. With the edge of the lever plate 76 free, it is restored to neutral position by the spring 108. An equivalent arrangement is shown in Fig. 7 in which a pair of balanced springs 120 and 122 accomplish the same function, and a spring 124 pushes the core 106 into the recesses.

When the driver desires to indicate a turn, he manually moves the arm 84 to energize either the right or the left hand circuit. After the turn has been made, the depression of the treadle 20 will energize the solenoid 104 and thereby restore the device to neutral. This comprises the self-cancelling feature of the invention, and although it requires the movement of the treadle 20, since after a turn has been made it is almost always required that the car be accelerated, this is substantially automatic operation, and requires no acts of the driver other than normal movements made even were the device not associated with the vehicle. Furthermore, considerable control is occasioned by such an arrangement since the treadle is capable of considerable movement at various speeds of the vehicle without materially affecting the speed due to the inertia of the vehicle.

Referring now to Figs. 2 and 3, the cancelling switch 68 includes a plate 126 suitably mounted on a bracket 128 secured to the carburetor 15 as at 130. An enclosed casing 132 houses the electrical contacts of the switch and same is suitably secured to an ear 134 which is attached to the mounting plate 126 in any suitable manner. Through slot 136 and screws 138 and/or any other suitable means, the position of the plate 126 can be adjusted within limits. A push button 140 extends out of the housing 132 and is spring-biased outward of the casing 132 and hence adapted to be depressed to close the electrical contacts of the switch.

The switch 68 is actuated by the mechanism designated generally 66. Same includes a stub shaft 142 secured to the plate 128 and having a rocker arm 143 mounted on the shaft and adapted to engage the end of the push button 140. At the opposite end of the arm 143 there is a projection 144 by means of which the arm 143 will be pivotally rocked into engagement with the said push button. The end of the shaft 142 is flattened at 146 and a washer 148 non-rotatively engaged thereon and held in place by a suitable cotter pin 150. There is a spring 152 coiled around the shaft and having one end secured to the arm at 154 and the other end secured to the washer at 156. The spring is so coiled that the arm 143 is biased against the push button 140, but not with sufficient force to depress the same. This arrangement not only eliminates play and possible rattling, but gives rise to another advantage presently to be described.

Two split clamping members 158 and 160 are secured to the shaft 24 side by side. Each has a projecting tooth 162 and 164 respectively which is adapted to engage the projection 144, said projection being wide enough to lie in the path of both teeth. The relative position of the teeth with respect to the position of rotation of the shaft 24 is easily adjusted by merely loosening the screws 166 and 168, moving the members 158 and 160 and then retightening the said screws. The positions of the teeth may be adjusted in accordance with the driving habits of the operator of the vehicle 10. Thus, suppose that after making a normal turn the driver is accustomed to accelerating at least beyond 20 miles per hour. Tooth 162 is then adjusted in position to engage against projection 144 and move same at about the setting of the carburetor shaft 24 which would give this speed. Thus, if the turn had been previously signalled, solenoid 104 would be actuated at about when approximately 20 miles per hour of speed had been reached in accelerating.

Let us presume further that the driver is accustomed to cruising at about 35 miles per hour. Then the tooth 164 is adjusted to move the arm 143 and depress the button 140 at say a setting of 50 miles per hour, so that if cruising at normal speed, the driver may signal that he is about to pass. The turn signal indicating circuit energized operates and is restored to neutral when the throttle is opened to give a speed of about 50 miles per hour. This may not be at a time when the vehicle has attained such speed, but it gives sufficient time for warning, and when the treadle is depressed a great deal beyond cruising, the turn has already been entered. Obviously, it is a simple matter to adjust the device to one's own driving habits, and it is also obvious that more than two members like 158 and 160 may be provided for various types of driving conditions.

Although the teeth 162 and 164 may be made adjustable relative to shaft 124 this is not essential for efficient operation of the device. It is conceivable that a single member having two teeth a given number of degrees apart could be permanently or adjustably secured to the shaft 24. The first tooth 162 could be positioned so that considerable maneuvering can be done at lower settings of the fuel feed without operating switch 68. Even at slower speeds, a sudden depressing and release of the treadle 20 would be sufficient to cause cancellation of a signal without materially increasing speed. As previously explained, the inertia of the vehicle prevents this. The tooth 16 may likewise be set for cancellation at carburetor settings corresponding to high speeds not necessarily attainable in order to cause cancellation.

It is pointed out that the solenoid is energized only during acceleration. This is accomplished by the novel construction of the switch actuating means 66. As will be seen in Fig. 2, rotation of the shaft 24 in a clockwise direction will cause the teeth 162 and 164 consecutively to engage the projection 144 which will rotate the arm 143 in a counter-clockwise direction about the shaft 142. As the tooth 162, for example, passes, the button 140 will be pressed and then released. Since this type of switch has a spring biased button, after the tooth has passed, the button will spring out and open the switch. The same thing occurs when the second tooth 164 passes. Obviously, the position of the carburetor throttle (indicated in broken lines at 180) is such at the time the tooth 164 engages the projection 144 that the speed of the vehicle may be high.

From the position just described, i. e., high fuel-feed position, as the shaft 24 is rotated counter-clockwise, as in releasing the treadle 20, as the teeth 164 and 162 engage the projection 144, the arm 143 will be rocked in a clockwise direction around the shaft 142 and against the bias of the spring 152 which will snap the arm back to the position shown in Fig. 2 the moment the respective tooth has passed. This will not in any way affect the switch 68. The structure enables the signal indicating device to be cancelled at any position of the throttle between the two settings and below the lower setting so that if the vehicle is moving with a speed at which the projection 144 is between the teeth 162 and 164 driver can indicate a turn to be made, slow down without the necessity of decreasing fuel feed below the point of which tooth 164 is to the right of projection 144 (Fig. 2), and then accelerate after the turn has been made at which time the indicator will restore itself to neutral. Likewise, there is no need to hold the manual arm in any position.

It should also be obvious if the speed of the vehicle is such that the tooth 164 has already rotated past projection 44, and it is desired to signal a turn, this can be done, and the signals circuit will indicate this intention. To cancel, the treadle need only be released for an instant and then quickly depressed, without substantially changing speed. This will permit tooth 164 to rotate to the left of projection 144 in Fig. 2, and then move past the same in a direction to cause depression of button 140. This same maneuver may be accomplished, if desired, with an accompanying change of speed.

Referring now to the circuit diagram of Fig. 7, an explanation of a practical installation will be made in which the invention has been built into the electrical lighting circuit of the vehicle. The particular vehicle has a right rear stop light 200, a left rear stop light 201, a right front parking light 202, and a left front parking light 203. Each of these lights has a filament, one end of which is grounded and each is intended to receive energy from a storage battery 205 which, of course, has one terminal grounded. The ordinary functions of these lights must be accomplished during non-operating position of the indicator device, and hence, when the switch mechanism 62 is in neutral position, illustrated in Fig. 7, the driver must be able independently to turn on the parking lights or the stop lights through appropriate switches. In Fig. 7, the lever 76 of the switch mechanism 62 has been symbolically separated into its components indicated by the disc 76" carrying the projections 90 and 92 for operation of the master switch M, the disc 76' carrying the projection 96 for operating the right circuit switch R, and the disc 76 carrying the projection 100 for operating the left circuit switch L. Actually, the lever 76 illustrated in the other figures could be constructed of three such wafers all moving together.

In the neutral position of the switch mechanism 62, none of the switches M, R, or L have their button depressed. The circuit of the parking lights 202 and 203 may be traced to the battery 205 as follows: conductor 207 from left lamp 203 through normally closed contacts 209 to conductor 221 that joins conductor 211 at juncture 223 the remainder of the circuit being common to both lamps. Since the lamps and the battery have their second terminals grounded, closing the switch 213 will light the parking lamps 202 and 203 independently of the turn indicator.

Substantially the same kind of circuit is used in connection with a brake actuated switch 225 to light the right and left rear stop lights 200 and 201. The stop light switch 225 and a fuse 227 are in the common conductor 229 between the battery terminal 219 and the juncture 231.

Presume that the vehicle is moving along the road and the driver desires to signal a left turn. He grasps the handle 84 and moves it to the left, rotating the block 88 or all of the wafers 76, 76', and 76" of Fig. 7 to the left. This brings the projection 100 into engagement with the button 102 and the projection 92 into the engagement with the button 94, but has no effect whatever on the button 98.

Referring now to switch L, the depression of the button 102 closes the normally open contacts 241 and the normally open contacts 243. The contacts 241 are respectively connected to the lamps 210 and 203 by electrical conductors 245 and 247 and the contacts 243 are respectively connected to both leads 245 and 247, and to lead 249. The lead 249 joins electrical conductor 251 at a juncture 253, the conductor 251 being connected through an intermittent flashing unit 255 and conductor 257 to a juncture 259 with lead 215. Obviously, the lamps 201 and 203 will commence flashing, as will the indicator lamp 261 which is connected through the flasher 255 in parallel with the battery 205. The lamp 261 is mounted on a suitable base 265 in the housing 60 and its flashing can be seen by the operator through a jewel 267 set in the top of the housing 60.

When the driver steps on the treadle 20 he causes the tooth 162 or the tooth 164 to actuate the switch button 140 and close the normally open contacts of the switch 68. This completes the circuit of the solenoid 104 to ground through the conductor 70, normally open contacts 269 and conductor 271. The solenoid pulls the core 106 out of engagement with the recess 118 and restores the device to neutral in the manner previously explained.

Substantially the identical operation of the switching mechanism 62 is achieved when the operator signals for a right turn. The projection 96 engages button 98, the projection 90 engages button 94 and the projection 100 is free. Circuits to the right hand lamps 200 and 202 are closed causing same to flash as follows: conductors 273 and 275 to the normally open contacts 277 of switch R and both thence connected by way of normally open contacts 279 through lead 281 to juncture 253. This completes the flashing circuit as described and the flashing will continue until stopped in the manner described, by energization of the solenoid 104.

It is desired to emphasize that many minor variations and changes in the details are possible without in any way departing from the spirit of the invention as exemplified in the claims appended hereto.

What is claimed is:

1. In a self-cancelling turn signal indicator for a vehicle having a foot-operated throttle control linkage and having signalling lights and circuits for operating said lights, and having a self-restoring switch mechanism normally in a neutral condition wherein the signalling lights and circuits are not energized, but capable of being manually moved to selective circuit energizing condition; means for permitting said switch mechanism to restore itself to neutral position comprising, a detent mechanism associated with the switch mechanism for holding same when moved, an electromagnetic device arranged when energized to cause the detent mechanism to release the said switch mechanism, means for energizing the electromagnetic device adapted to be actuated by said linkage whereby to be controlled by the operator of the vehicle during use of the linkage, said last mentioned means comprising a switch, a rocker arm pivotally mounted with one end adapted to engage the switch and the other end free, a projection adjustably mounted upon a rotatable portion of the said linkage and adapted in its rotative movement to engage the second end of the rocker arm and close the switch.

2. In a self-canceling turn signal indicator for a vehicle having a foot-operated throttle control linkage and having signalling lights and circuits for operating said lights, and having a self-restoring switch mechanism normally in a neutral condition wherein the signalling lights and circuits are not energized, but capable of being manually moved to selective circuit energizing condition; means for permitting said switch mechanism to restore itself to neutral position comprising, a detent mechanism associated with the switch mechanism for holding same when moved, an electromagnetic device arranged when energized to cause the detent mechanism to release the said switch mechanism, means for energizing the electromagnetic device adapted to be actuated by said linkage whereby to be controlled by the operator of the vehicle during use of the linkage, said last mentioned means comprising a switch, a rocker arm pivotally mounted with one end adapted to engage the switch and the other end free, a projection adjustably mounted upon a rotatable portion of the said linkage and adapted in its rotative movement to engage the second end of the rocker arm and close the switch, there being a second projection on the said linkage also adapted to engage the said second end, whereby the switch will be closed at two different conditions of fuel feed.

3. In a turn signal indicator, associated with a vehicle having an accelerator linkage, a switch mechanism including a lever movable to a plurality of circuit establishing positions, means biasing the lever to neutral position, a solenoid operated detent mechanism normally holding the circuit establishing positions but rendered inoperative when the solenoid is energized, means for energizing the solenoid connected with the linkage and including a switch adapted to be closed at a predetermined condition of fuel feed, said linkage having a rotatable shaft, and said last mentioned means including a tappet positioned on said shaft and adjustable to any circumferential position relative to the shaft, a rocker arm pivotally mounted independent of said linkage and having one end engaging the switch and the other adapted to engage the tappet during use of the linkage.

4. In a turn signal indicator, associated with a vehicle having an accelerator linkage, a switch mechanism including a lever movable to a plurality of circuit establishing positions, means biasing the lever to neutral position, a solenoid operated detent mechanism normally holding the circuit establishing positions but rendered inoperative when the solenoid is energized, means for energizing the solenoid connected with the linkage and including a switch adapted to be closed at a predetermined condition of fuel feed, said linkage having a rotatable shaft, said last mentioned means including a tappet positioned on the shaft and adjustable circumferentially thereon, a rocker arm biased against said switch, but with insufficient bias to actuate the same, the tappet being arranged to engage said rocker arm to close the switch when said shaft is rotated in one direction, and to engage said rocker arm to rock the same in an opposite direction against the bias when the shaft is rotated in an opposite direction.

5. A turn indicating system adapted to be associated with an automobile having an accelerator linkage including a rotatable shaft controlling the flow of fuel to the engine thereof, including a pair of indicating circuits and associated devices, a switch mechanism for selectively energizing said circuits from a source of electrical power but normally in non-energizing condition, means biasing said switch mechanism to non-energizing condition, a solenoid having a core member movable when same is energized to hold the switch mechanism in any condition in which it is put, a push-button switch mounted on the engine and connected to energize the solenoid from said power source, a tooth mounted on the shaft and adapted to push the said button to energize the switch when said shaft is rotated by means of said linkage to a given position of rotation, there being a rocker arm interposed between the tooth and the button and biased against the button, but not sufficient to actuate the same, whereby the switch will be closed when the tooth is rotated past the rocker arm in one direction, but the rocker arm will rock against the bias when the tooth rotates past the same in the opposite direction, without closing the switch.

References Cited in the file of this patent

UNITED STATES PATENTS

| 1,620,456 | Gallus et al. | Mar. 8, 1927 |
| 1,705,135 | Phillips | Mar. 12, 1929 |
| 1,748,929 | Woodring | Feb. 25, 1930 |
| 1,902,700 | Hadano | Mar. 21, 1933 |
| 2,126,940 | Metcalf | Aug. 16, 1938 |
| 2,133,000 | Trautner et al. | Oct. 11, 1938 |
| 2,147,406 | Horton | Feb. 14, 1939 |
| 2,183,349 | Fukuhara | Dec. 12, 1939 |
| 2,186,766 | Metcalf | Jan. 9, 1940 |
| 2,396,551 | Boyce | Mar. 12, 1946 |

FOREIGN PATENTS

| 477,021 | Germany | June 3, 1929 |